Figure 3:
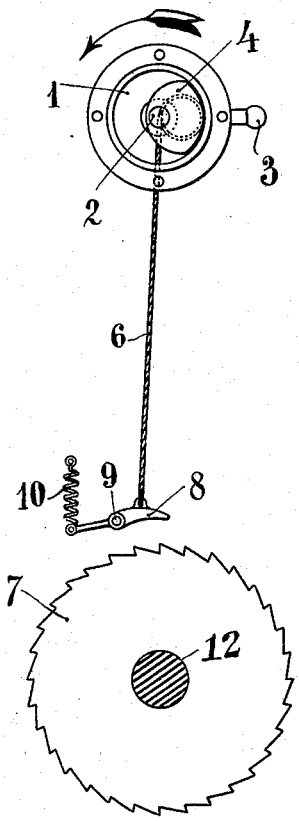

A. BALLOCO.
CONTROLLING DEVICE.
APPLICATION FILED APR. 16, 1907.
905,135.
Patented Dec. 1, 1908.
2 SHEETS—SHEET 1.
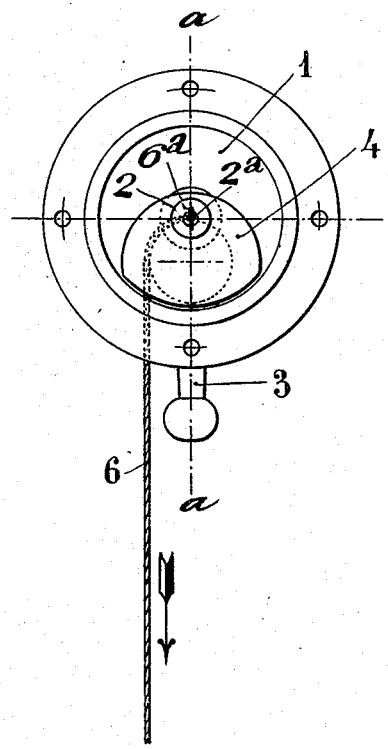
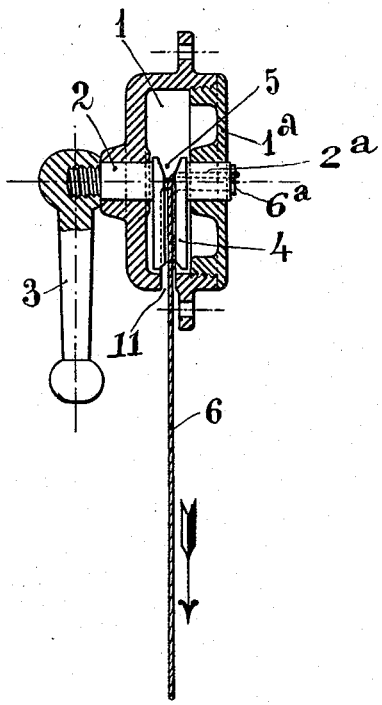

A. BALLOCO.
CONTROLLING DEVICE.
APPLICATION FILED APR. 16, 1907.

905,135.

Patented Dec. 1, 1908.

2 SHEETS—SHEET 2.

UNITED STATES PATENT OFFICE.

ALBERTO BALLOCO, OF TURIN, ITALY, ASSIGNOR TO SOCIETE ANONYME "ITALA" FABRICA DI AUTOMOBILI, OF TURIN, ITALY.

CONTROLLING DEVICE.

No. 905,135.          Specification of Letters Patent.          Patented Dec. 1, 1908.

Application filed April 16, 1907. Serial No. 368,558.

*To all whom it may concern:*

Be it known that I, ALBERTO BALLOCO, a subject of the King of Italy, residing in Turin, Italy, have invented certain new and useful Improvements in Controlling Devices, of which the following is a specification.

This invention relates to certain improvements in controlling devices such as are adapted for manual actuation for the control of moving mechanical parts, and the object of the invention is to provide a device of this character of a simple and inexpensive nature by means of which practically instantaneous or immediate operation may be attained for the control or regulation of such moving parts and which is further adapted for substantially instantaneous or immediate reverse actuation.

The invention consists in certain novel features and principles of the construction, and combinations and arrangements of the several parts of the improved controlling device, whereby certain important advantages are attained and the device is rendered simpler, cheaper and otherwise better adapted and more convenient for use, all as will be hereinafter fully set forth.

The novel features of the invention will be carefully defined in the claims.

In the accompanying drawings which serve to illustrate my invention, I have shown my improvements embodied in a controller adapted for employment for controlling the operation of the means for preventing backing or reverse movement of an automobile or the like.

In these drawings—Figure 1 is a rear face view of the improved controller with its rear cap or cover removed to illustrate the internal parts of the device; Fig. 2 is a transverse section taken through the device in the plane indicated by the line *a—a* in Fig. 1, and Fig. 3 is a view somewhat similar to Fig. 1, but drawn upon a smaller scale and showing the device applied for use in connection with the detent mechanism upon the transmission shaft, and the eccentric member of said device adjusted to a different position from that shown in Fig. 1.

As shown in these views, the improved controlling device comprises a circular casing 1 adapted to be secured upon a suitable support and having a removable back plate or cap 1ª at its rear side or face. This casing is provided with a cylindrical hollow or chamber, and at its front and back sides or parts, the said casing has alined centrally arranged bearings wherein are held to turn the pivots or journals 2, 2 of a clamping member 4 which has a central rounded part within the hollow or chamber of the casing, and set eccentrically with relation to the pivots or journals 2, 2, and is adapted, when rotated, to be rocked or rotated within said hollow or chamber of the casing 1.

The central rounded portion of the member 4 has a perimetral groove 5 produced around it, the base or floor of said groove being circular in form, as shown in dotted lines in Fig. 1, and being adapted to receive one or more turns of a flexible connector 6, which may be conveniently made in the form of a wire cable. At the back of the casing, the rear pivot or trunnion 2 of the member 4 is provided with an axial bore extended through it as shown at 2ª on the drawing, and this bore 2ª communicates with the groove 5 in the rounded perimetral surface of the member 4 in such a manner that the extremity of the connector 6 may be passed from said groove through said bore 2ª and may be secured to said rear trunnion or pivot 2 in any preferred way, as for example, by means of a pin 6ª as shown in Figs. 1 and 2 of the drawings.

The casing 1 has an opening 11 extended around its perimeter, said opening being slotted and of any suitable length, and serving for the passage of the flexible connector 6 after the same shall have been engaged with the perimetral groove 5 and bore 2ª of the eccentric member 4, and the outer end of said connector may be coupled to any desired mechanism in connection with which the improved controlling device is intended for use, as for example to the pawl or detent 8 pivoted at 9 and having a spring 10 the tension of which is exerted to hold said pawl or detent normally engaged with the teeth of a ratchet wheel 7 upon the transmission shaft 12 of a motor vehicle in such a manner as to prevent back rotation thereof in a well known way.

The forward or outer pivot or trunnion 2 of the member 4 is extended outward from the front face of the casing 1, and is screw-threaded to receive a handle 3 by the manipulation of which the member 4 may be turned or rocked within the hollow or chamber of the said casing in such a manner as to permit of drawing the connector 6 endwise in such a manner as to elevate the pawl or detent 8 out of engagement with the teeth of the ratchet wheel 8 and thereby permit free back rotation of the transmission shaft 12 whenever desired.

In the operation of the device, since one point in the grooved perimeter 5 of the member 4 coincides with the axis of rotation of said member, it will be obvious that when the parts are so positioned that the cord or connector 6 forms a radius vector between the pawl or detent 8 and said axis of rotation, as shown in Fig. 3, the said connector 6 can exert no leverage to turn the eccentric member 4, and consequently, said member will be effectively held in such position, and endwise movement of said connector will be effectively prevented. In this way, assuming the normal position of the parts to be shown in Fig. 1, it will be understood that when the member 4 is turned within casing 1 by the manipulation of the handle 3, the connector 6 is wound around the grooved perimeter 5 of said member until said connector corresponds with a line drawn from pawl or detent 8 to the axis of rotation of said member 4, whereby said connector 6 is drawn endwise to elevate the pawl or detent 8 against the tension of its spring 10 out of engagement with the teeth of wheel 7, and is automatically locked in position against endwise movement so as to serve to retain said pawl or detent in raised position.

A comparatively slight reverse movement of the handle 3 will suffice to throw the connector 6 out of line with the axis of rotation of member 4, whereby said connector will commence to exert a leverage tending to reversely turn said member under the influence of spring 10, and when this leverage shall have risen sufficiently high, it is evident that the tension of spring 10 will eventually serve to return the eccentric member 4 from the position shown in Fig. 3 to that shown in Fig. 1, whereupon the connector 6 being withdrawn endwise from the casing 1, the pawl or detent 8 is restored to its normal position in engagement with the teeth of the ratchet wheel 7. By this arrangement of the parts, the connector may be drawn endwise and securely held in position by a simple turning movement of the eccentric member 4, and when the spring 10 is employed, as in the construction shown in Fig. 3, a comparatively slight reverse movement of said handle 3 will suffice to release said member 4 and permit the spring to operate to withdraw the connector from the casing 1.

From the above description of my improvements it will be seen that the controlling device constructed according to my invention is of an extremely simple and comparatively inexpensive nature, and is especially well adapted for use by reason of the substantially instantaneous and automatic action both in its application and release, and it will also be obvious from the above description that the device is capable of considerable modification without material departure from the principles and spirit of the invention and for this reason I do not desire to be understood as limiting myself to the precise form and arrangement of the several parts of the device as herein set forth in carrying out my invention in practice.

Having thus described my invention, what I claim and desire to secure by Letters Patent is—

1. A controlling device comprising a frame or casing, a member mounted to turn thereon and having an eccentrically extended perimetral channel one part of which is coincident with the axis of rotation of said member, and a flexible connector passed around the eccentric channel of said member and adapted to be drawn endwise in the turning movement of said member.

2. A controlling device comprising a frame or casing, a member having a pivot held to turn on the frame or casing and provided with an axial bore, said member being also provided with an eccentrically extended perimetral channel with one part of which said bore communicates, and a flexible connector passed through the bore of said pivot and extended in said eccentrically extended channel and adapted to be drawn endwise when said member is turned.

In witness whereof I have hereunto signed my name this 22nd day of March 1907, in the presence of two subscribing witnesses.

ALBERTO BALLOCO.

Witnesses:
 SCUNDO CORTS,
 LOUIS ALLAN.